United States Patent
Fu et al.

(10) Patent No.: US 12,252,910 B1
(45) Date of Patent: Mar. 18, 2025

(54) DOOR HANDLE WITH AMBIENT LIGHT

(71) Applicant: FCA US LLC, Auburn Hills, MI (US)

(72) Inventors: Xuezhong Fu, Shanghai (CN); Wei Fang, Shanghai (CN); Junxue Ma, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/525,929

(22) Filed: Dec. 1, 2023

(51) Int. Cl.
*E05B 85/16* (2014.01)
*B60Q 1/26* (2006.01)

(52) U.S. Cl.
CPC ............ *E05B 85/16* (2013.01); *B60Q 1/2669* (2013.01)

(58) Field of Classification Search
CPC ................................ E05B 85/16; B60Q 1/2669
See application file for complete search history.

(56) References Cited

U.S. PATENT DOCUMENTS

| | | | |
|---|---|---|---|
| 7,375,299 B1 | 5/2008 | Pudney | |
| 8,807,807 B2 | 8/2014 | Wheeler et al. | |
| 9,441,403 B2 | 9/2016 | Kraus et al. | |
| 11,130,442 B2 | 9/2021 | Dingman et al. | |
| 2006/0274539 A1* | 12/2006 | Chou | B60Q 1/38 362/459 |
| 2007/0195542 A1* | 8/2007 | Metros | B60Q 1/2669 362/501 |
| 2007/0206388 A1* | 9/2007 | Misawa | B60Q 1/2669 362/501 |
| 2007/0216172 A1* | 9/2007 | Chang | E05B 17/10 292/336 |
| 2007/0258258 A1* | 11/2007 | Wang | E05B 17/10 362/501 |
| 2007/0263401 A1* | 11/2007 | Shi | E05B 17/10 362/544 |
| 2009/0279826 A1* | 11/2009 | Ieda | G02B 6/0008 292/336.3 |
| 2010/0117381 A1* | 5/2010 | Sung | E05B 17/10 292/336.3 |
| 2012/0106182 A1* | 5/2012 | Minter | E05B 17/10 16/412 |
| 2019/0248332 A1* | 8/2019 | De Wind | B60R 25/241 |

FOREIGN PATENT DOCUMENTS

| | | |
|---|---|---|
| JP | 4240307 B2 | 3/2009 |
| WO | 2007028955 A1 | 3/2007 |

* cited by examiner

*Primary Examiner* — Bryon T Gyllstrom
(74) *Attorney, Agent, or Firm* — Jeremy J. Klobucar

(57) ABSTRACT

A door handle assembly for a vehicle has a handle structure with an arcuate side edge. A light is coupled with the handle structure. An inner handle structure is coupled with the handle structure sandwiching the light between the handle structure and the inner handle structure. A single attachment member secures the door handle assembly with the vehicle door.

13 Claims, 2 Drawing Sheets

Figure 1:
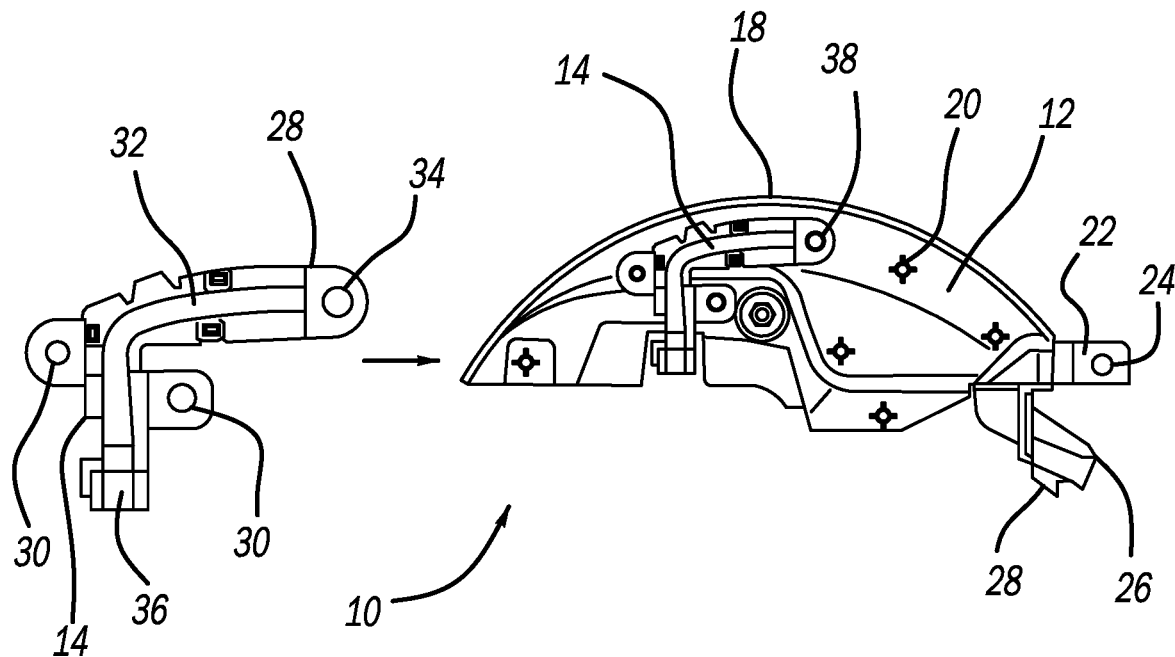

DOOR HANDLE WITH AMBIENT LIGHT

FIELD

The present disclosure relates to vehicles and, more particularly, to a C-shape door handle with ambient light.

BACKGROUND

This section provides background information related to the present disclosure which is not necessarily prior art.

In automotive vehicles, it is desirable to have illumination around the door handle to assist the driver or passenger getting into the vehicle. Current door handles are long bar handles that are fixed on the door by a pair of bolts. Thus, with this particular type of handle, it is difficult to integrate an ambient light with the bar handle. The bar handle generally requires more space which adds weight to the vehicle to integrate an ambient light.

Thus, it would be desirable to provide a door handle with an ambient light that does not require additional space or add additional weight to the vehicle. Accordingly, the present disclosure provides the art with a door handle that overcomes the deficiency of the prior art.

According to the disclosure, a door handle integrates an ambient light into the handle without requiring additional space or adding weight to the vehicle. The present disclosure provides a semi-circular shaped handle that includes an ambient light and is aesthetically pleasing. The disclosure provides a door handle that is smaller in space and weight and is aesthetically pleasing. The present disclosure changes the long bar handle styling to a semi-circular design.

SUMMARY

This section provides a general summary of the disclosure, and is not a comprehensive disclosure of its full scope or all of its features.

According to the present disclosure, a vehicle door handle comprises a handle structure with an arcuate side. A light is coupled with the handle structure. An inner handle structure is coupled with the handle structure sandwiching the light between the handle structure and the inner handle structure. A single attachment member secures the door handle with the vehicle door. An aesthetic cover is coupled with the handle structure. A weld, clips or screws are used to secure the light to the handle structure. Likewise, welds or screws are utilized to secure the handle structure with the inner handle. The arcuate side is generally semi-circular in configuration. The single attachment member is cantilevered from the handle structure. A positioning pin is cantilevered from the handle structure to assist in positioning the handle onto the door.

According to a second embodiment of the disclosure, a vehicle door with a handle comprises a vehicle door including a handle. The handle comprises a handle structure with an arcuate side. A light is coupled with the handle structure. An inner handle structure is coupled with the handle structure sandwiching the light between the handle structure and the inner handle structure. A single attachment member secures the door handle with the vehicle door. An aesthetic cover is coupled with the handle structure. A weld, clips or screws are used to secure the light to the handle structure. Likewise, welds or screws are utilized to secure the handle structure with the inner handle. The arcuate side is generally semi-circular in configuration. The single attachment member is cantilevered from the handle structure. A positioning pin is cantilevered from the handle structure to assist in positioning the handle onto the door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
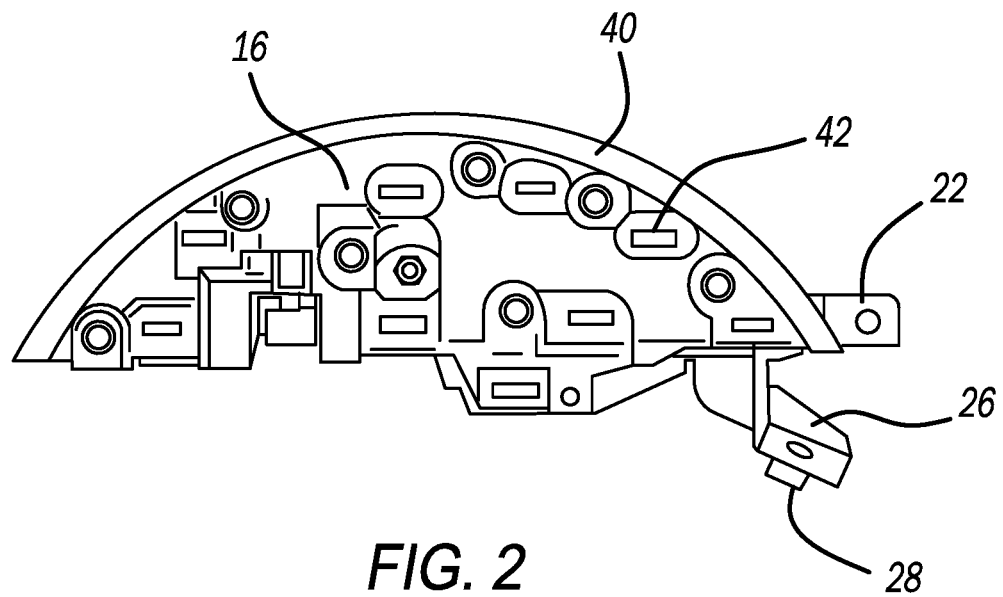
Figure 3:
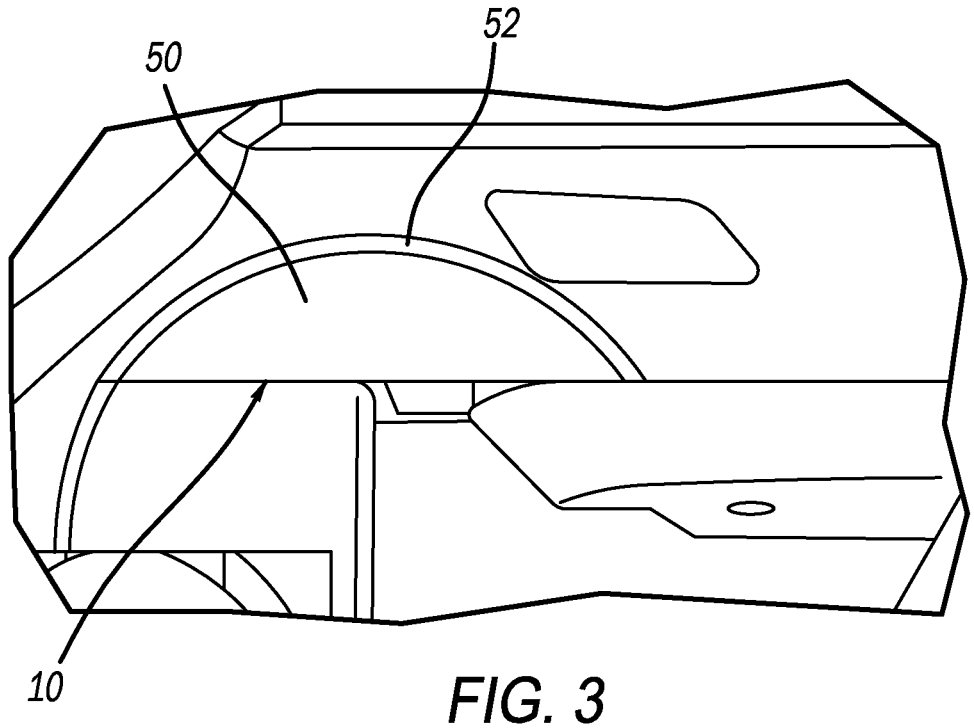
Figure 4:
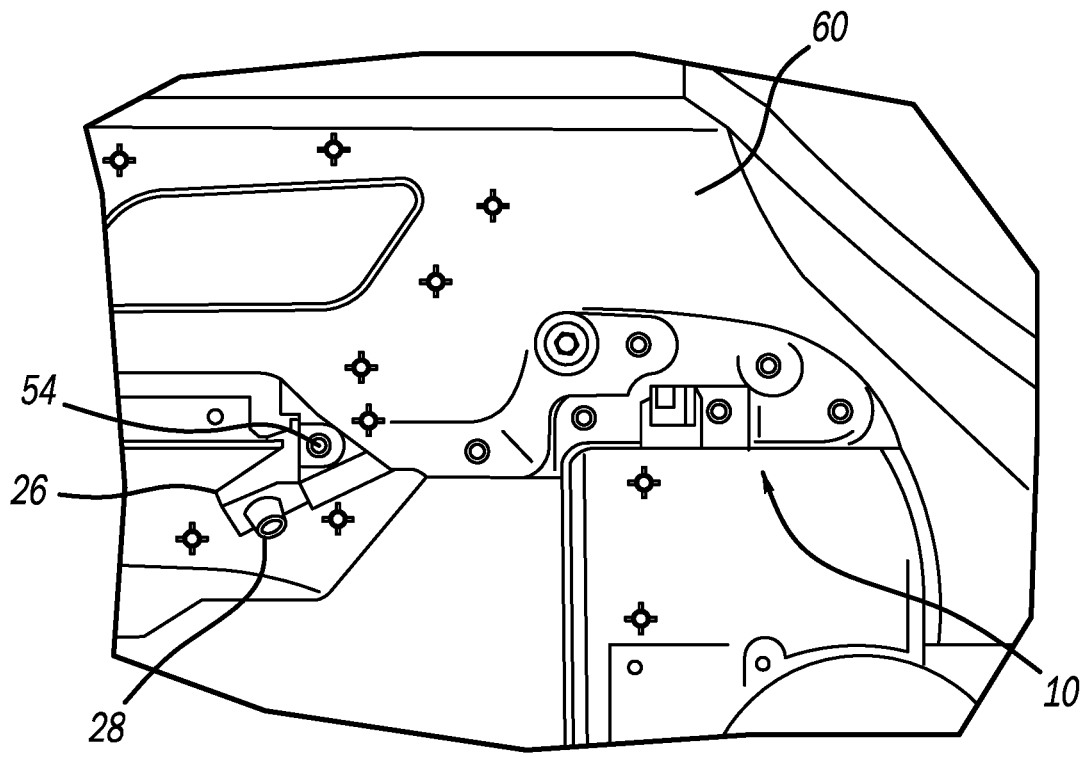

FIG. 1 is a perspective elevation view of a door handle.
FIG. 2 is a view like FIG. 1 with an additional inner panel.
FIG. 3 is a plan view of a handle cover.
FIG. 4 is a elevation view of the handle secured with a vehicle.

Corresponding reference numerals indicate corresponding parts throughout the several views of the drawings.

DETAILED DESCRIPTION

Example embodiments will now be described more fully with reference to the accompanying drawings.

Turning to the figures, a door handle assembly is illustrated and designated with the reference numeral 10. The door handle assembly 10 includes a handle structure 12, an ambient light 14 and an inner handle structure 16.

The handle structure 12 has an arcuate side edge 18 that provides the handle structure with an overall semi-circular configuration. The handle structure 12 includes a plurality of pins 20 that provide receiving portions. The handle structure 12 includes a cantilevered attachment member 22. The attachment member 22 includes an aperture 24 to receive a screw or the like to secure the handle to the door. Also, the handle structure 12 includes a cantilevered beam 26. The cantilevered beam 26 includes a pin 28 that is positioned into a bore on the vehicle door to position the handle onto the vehicle door.

The light 14 includes attachment members 30. The attachment members 30 extend from the light body 32 and have apertures 34 that are positioned on pins 20 on the handle structure 12. The light 14 includes a LED, bulb 34, or the like to provide different intensities or colors for the light 14. The light 14 may be secured to the handle structure 12 by a weld 38, clips screws or the like. Thus, the light 14 is secured to the handle structure 12.

The inner handle structure 16 is secured with the handle structure 12 by welds, screws, clips or the like. The inner handle structure 16 has an arcuate side 40 to provide it with an overall semi-circular configuration. The inner handle structure 16 includes a plurality of apertures 42 to receive the pins 20. The pins 20 may be welded with the inner handle structure 16. Additionally, the inner handle structure 16 sandwiches the light between the inner handle structure 16 and handle structure 12. Also, it provides additional reinforcement to the handle assembly 10.

A handle cover 50 is secured to the other side of the handle structure 12. The handle cover 50 has an overall semi-circular configuration with an arcuate edge 52 aligned with the arcuate side edge 18 of handle structure 12 and inner handle structure 16. A cover provides a pleasing aesthetic appearance to the door handle 10.

As can be seen in FIG. 4, the door handle assembly 10 is secured to the door 60 via a single bolt 54. The pin 28 is positioned into an aperture in the door 60 to position the handle to secure the bolt 54 in place on the door 60. Thus, this provides a smaller aesthetically pleasing handle assembly 10 that takes up less space and adds less weight to the vehicle.

Accordingly, the handle assembly 10 eliminates the long bar structure that requires a bolt on each end. The ambient light 14 is welded into the handle structure 12 at the bosses and then the inner handle structure 16 is welded or mechanically secured with the handle structure 12 sandwiching the light 14 between the two handle structures 12 and 16. The cover 50 is added to provide an aesthetically pleasing appearance. The ambient light 14 may provide different colors or intensity to the handle assembly to improve convenience and aesthetics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door handle assembly for a vehicle comprising:
   a handle structure with an arcuate semi-circular side edge;
   a light coupled with the handle structure;
   an inner handle structure coupled with the handle structure sandwiching the light between the handle structure and the inner handle structure; and
   a single attachment member for securing the door handle assembly with the vehicle door.

2. The door handle assembly for a vehicle of claim 1, further comprising an aesthetic cover coupled with the handle structure.

3. The door handle assembly for a vehicle of claim 1, wherein a weld, clips or screws secure the light to the handle structure.

4. The door handle assembly for a vehicle of claim 1, wherein welds or screws secure the handle structure and inner handle together.

5. The door handle assembly for a vehicle of claim 1, wherein the single attachment member is cantilevered from the handle structure.

6. The door handle assembly for a vehicle of claim 1, wherein a positioning pin is cantilevered from the handle structure.

7. A vehicle door with a handle comprising:
   a vehicle door including a handle, the handle comprising:
   a handle structure having an arcuate semi-circular side edge;
   a light coupled with the handle structure;
   an inner handle structure coupled with the handle structure sandwiching the light between the handle structure and the inner handle structure; and
   a single attachment member securing the door handle assembly with the vehicle door.

8. The vehicle door with a handle of claim 7, further comprising an aesthetic cover coupled with the handle structure.

9. The vehicle door with a handle of claim 7, wherein a weld, clips or screws secure the light to the handle structure.

10. The vehicle door with a handle of claim 7, wherein welds or screws secure the handle structure and inner handle together.

11. The vehicle door with a handle of claim 7, wherein the single attachment member is cantilevered from the handle structure.

12. The vehicle door with a handle of claim 7, wherein a positioning pin is cantilevered from the handle structure.

13. A door handle assembly for a vehicle comprising:
   a handle structure with an arcuate side edge;
   a light coupled with the handle structure;
   an inner handle structure coupled with the handle structure sandwiching the light between the handle structure and the inner handle structure; and
   a single attachment member for securing and supporting the door handle assembly with the vehicle door such that the handle structure is cantilevered by the single attachment member for supporting and securing the handle structure from only one side of the handle structure.

* * * * *